US008798266B2

(12) United States Patent
Drader et al.

(10) Patent No.: US 8,798,266 B2
(45) Date of Patent: *Aug. 5, 2014

(54) SECURE DATA TRANSFER ON A HANDHELD COMMUNICATIONS DEVICE

(71) Applicant: Research In Motion Limited, Waterloo (CA)

(72) Inventors: Marc A. Drader, Waterloo (CA); James Alexander Robinson, Elmira (CA); Michael Lorne Purdy, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,471

(22) Filed: Nov. 30, 2012

(65) Prior Publication Data

US 2013/0089200 A1 Apr. 11, 2013

Related U.S. Application Data

(62) Division of application No. 12/394,746, filed on Feb. 27, 2009, now Pat. No. 8,345,866.

(51) Int. Cl.
*H04L 9/00* (2006.01)
*H04L 9/08* (2006.01)

(52) U.S. Cl.
CPC ............ *H04L 9/0861* (2013.01); *H04L 9/0819* (2013.01); *G09G 2360/145* (2013.01)
USPC .............................. 380/44; 380/278; 713/171

(58) Field of Classification Search
CPC ........... G09G 2360/145; H04L 9/0819; H04L 9/0861; H04L 9/0894

USPC ................................ 380/44–45, 47, 277–278
See application file for complete search history.

(56) References Cited

U.S. PATENT DOCUMENTS

| 2004/0111601 | A1* | 6/2004 | Racz | 713/150 |
| 2005/0138390 | A1* | 6/2005 | Adams et al. | 713/185 |
| 2006/0256070 | A1 | 11/2006 | Moosavi et al. | |
| 2010/0005294 | A1 | 1/2010 | Kostiainen et al. | |

FOREIGN PATENT DOCUMENTS

| JP | 2008099058 | | 4/2008 |
| WO | WO 2007/045937 | | 4/2007 |
| WO | WO2007045937 | * | 4/2007 |

OTHER PUBLICATIONS

Reasearch in Motion Limited, "BlackBerry Smart Card Reader Security, Version 1.5 Technical Overview" 2006, pp. 1-27 http://docs.blackberry.com/zhtw/admin/deliverables/1710/BlackBerry Smart Card Reader Security Technical Overview.pdf (applicant provided).*

(Continued)

*Primary Examiner* — Jung Kim
*Assistant Examiner* — Carlos M De Jesus Lassaia
(74) *Attorney, Agent, or Firm* — McCarthy Tétrault LLP

(57) ABSTRACT

A handheld communications device for transmitting an encryption key is provided. The device comprises a display device, and a data processor. The data processor of the handheld communications device is in communication with the display device. The data processor is configured to generate an encryption key, and to vary a visual output of the display device over time in accordance with a bit sequence of the encryption key. The varying visual output comprises a sequence of colors and/or brightness levels output by the display device.

12 Claims, 11 Drawing Sheets

(56) References Cited

OTHER PUBLICATIONS

Research in Motion Limited, "BlackBerry Smart Card Reader Security, Version 1.5 Technical Overview" 2006, pp. 1-27; http://docs.blackberrry.com/zh-tw/admin/deliverables/1710/BlackBerry_Smart_Card_Reader_Security_Technical Overview.pdf.

Hirao, Hidenon, "Machine translation of JP 2008-099058", 2008, http://dossier1.ipdl.inpit.go.jp/AIPN/odse_call_transl.ipdl?N000=77413&N0005=Ei7BzenZVnBvfz7D1ZIK&N0120=01&N2001=2&N3001=2008-099058&Ntt4=&Ntt5=&Ntt6=&Ntt7=&Ntt8=&Ntt9=&Ntt10=&Ntt11=&Ntt12=.

\* cited by examiner

SECURE DATA TRANSFER ON A HANDHELD COMMUNICATIONS DEVICE

RELATED APPLICATION

This application is a divisional application of U.S. patent application Ser. No. 12/394,746 filed on Feb. 27, 2009.

FIELD

This patent application relates to a system of secure data transfer between local communications devices. In particular, this patent application relates to a method for wirelessly transmitting a private encryption key between a handheld communications device and a portable authenticator.

BACKGROUND

Many modern handheld communications devices, such as e-mail pagers, wireless telephones and personal digital assistants (PDAs) are configured with security software which is designed to prevent all but the authorized user from using the communications device. Typically, the security software requires the user to enter a password via the keypad or keyboard of the device. The security software only grants the user access to the device if the entered password matches a reference password which the user previously saved on the device.

This scheme does not provide a high level of security, particularly if the user configured the device with a password that can be easily guessed. The handheld communications device described by the Applicant in U.S. patent application Ser. No. 10/819,278 overcomes this deficiency by associating a portable authenticator reader with the device. The security software only grants the user access to the device if the entered password matches a reference password that is installed on the portable authenticator and the handheld communications device. As a result, an unscrupulous user must have both the portable authenticator and the reference password to access the device.

BRIEF DESCRIPTION OF THE DRAWINGS

This patent application describes a handheld communications device that configures a portable authenticator with an encryption key by transmitting the encryption key to the portable authenticator via the display light of the communications device.

A preferred embodiment of the handheld communications device and the portable authenticator will now be described, by way of example only, with reference to the accompanying drawings, in which.

DETAILED DESCRIPTION

Figure 1:
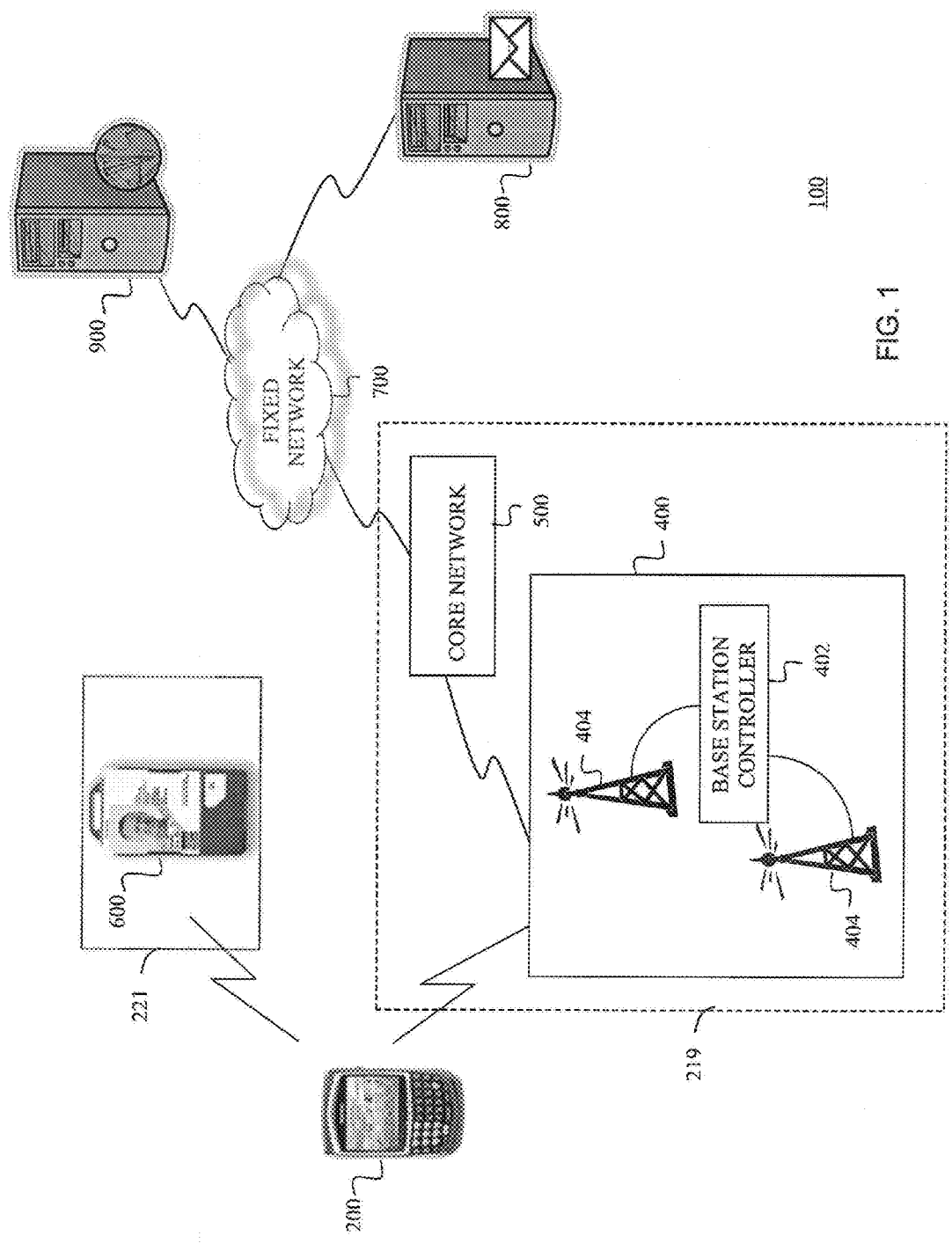
FIG. 1 is a schematic diagram depicting a communications network, including a handheld communications device and a portable authenticator.

By way of overview of embodiments of this disclosure, in a first aspect, a handheld communications device is provided. The device comprises: a display device; and a data processor in communication with the display device. The data processor is configured to: generate an encryption key, the encryption key comprising a bit sequence; and vary a visual output of the display device over a period of time in accordance with the bit sequence to transmit the encryption key from the handheld communications device by varying at least one of a sequence of colours rendered on the display device or a sequence of brightness levels output by the display device.

In the communications device, the display device may comprise a display light; and the data processor may be configured to vary the sequence of brightness levels output by the display light to transmit the encryption key.

In the communications device, the display device may be configured to render a plurality of colours thereon; and the data processor may be configured to vary the sequence of the colours and the sequence of brightness levels to transmit the encryption key.

In the communications device, the display device may be configured to render a plurality of colours thereon; and the data processor may be configured to vary the plurality of colours to transmit the encryption key. The data processor of the handheld communications device may be configured to provide the sequence of the brightness levels contemporaneously with the sequence of the colours.

The communications device may further comprise a wireless interface, and a memory. The data processor may be in communication with wireless interface and the memory and being configured to: receive a temporary encryption key via the wireless interface; compute a master encryption key from the temporary encryption key and the generated encryption key; receive a second temporary encryption key via the wireless interface; compute a public encryption key from the second temporary encryption key and the master encryption key; and save the public encryption key in the memory.

In the communications device, the data processor may be further configured to: encrypt data with the public encryption key; transmit the encrypted data via the wireless interface; receive via the wireless interface an authorization message in response to the encrypted data; and provide a user with access to the communications device based on the authorization message.

In the communications device intensities of light for the sequence of brightness levels may be varied over the period of time in the output of the display device to transmit the encryption key.

In the communications device a background colour may be varied over the period of time in the output of the display device to transmit the encryption key.

In the communications device, a predominant colour in an image generated on the display device may be varied over the period of time in the output of the display device to transmit the encryption key.

In the communications device an output of a display light for the display device may be varied over time to transmit the encryption key.

In another aspect this disclosure relates to a method of initiating secure communication with a portable authenticator. The portable authenticator comprises a light sensor, and a data processor that is in communication with the light sensor. The method involves detecting a sequence of colours and/or brightness levels via the light sensor, recovering a bit sequence from the detected colour/brightness sequence via the data processor, and generating an encryption key from the bit sequence via the data processor.

In yet another aspect, this disclosure relates to a portable authenticator. The portable authenticator comprises a light sensor, and a data processor. The data processor is in communication with the light sensor. The data processor is configured to recover a bit sequence from a sequence of colours and/or brightness levels detected at the light sensor, and to generate an encryption key from the bit sequence.

In one implementation, the colour/brightness sequence comprises a sequence of brightness levels, and the data processor of the portable authenticator is configured to recover the bit sequence from a sequence of the brightness levels.

In another implementation, the colour/brightness sequence comprises a sequence of colours, and the data processor is configured to recover the bit sequence from the sequence of colours. The colour/brightness sequence may comprise a sequence of brightness levels and a sequence of colours that are produced contemporaneously with the sequence of brightness levels. The data processor may be configured to recover the bit sequence from the sequence of brightness levels and the sequence of colours.

The portable authenticator may comprise a wireless interface and a memory, and the data processor may receive a temporary encryption key via the wireless interface, compute a public encryption key from the temporary encryption key and the generated encryption key, and save the public encryption key in the memory.

In still another aspect, this disclosure relates to a method of initiating secure communication from a handheld communications device. The handheld communications device comprises a display device, and a data processor that is in communication with the display device. The method involves generating an encryption key via the data processor, and varying a visual output of the display device over time in accordance with a bit sequence of the encryption key. The varying visual output comprises a sequence of colours and/or brightness levels output by the display device.

In another aspect, this disclosure relates to a handheld communications device. The handheld communications device comprises a display device, and a data processor. The data processor of the handheld communications device is in communication with the display device. The data processor is configured to generate an encryption key, and to vary a visual output of the display device over time in accordance with a bit sequence of the encryption key. The varying visual output comprises a sequence of colours and/or brightness levels output by the display device.

Turning now to FIG. 1, there is shown a communications network, denoted generally as 100, that comprises at least one wireless communications device 200, and may comprise a wireless communications network and a wired communications network. As shown, the wireless communications network may comprise a primary wireless network 219 and a secondary wireless network 221.

In the embodiment shown, the primary wireless network 219 comprises a long-range cellular network, and the secondary wireless network 221 comprises a short range local area wireless network. However, the primary wireless network 219 is not so limited, and may comprise a short range wireless network. Alternatively, if the communications device 200 is not configured to receive remote wireless services (e.g. voice communications, e-mail, web browsing), the primary wireless network 219 and the wired communications network may be eliminated, and the communications network 100 may simply comprise the communications device 200 and the secondary wireless network 221.

As shown, the long-range wireless cellular network 219 may comprise a plurality of remote base station subsystems (BSSs) 400, and a core network 500. The BSSs 400 provide a bridge between the wireless communications devices 200 and the core network 500. Each BSS 400 includes a Base Station Controller (BSC) 402 and a plurality of Base Transceiver Stations (BTSs) 404. Each BTS 404 includes one or more radio transceivers, the coverage area of each defining a long-range radio system cell. The BSC 402 acts as a physical connection between the handheld communications device 200 and the core network 500.

The wired communications network may comprise an e-mail server 800, a web server 900, and a fixed network 700. The core network 500 acts as switching node to the fixed network 700, and implements slow-speed data and/or telephony communication protocols. The fixed network 700 may comprise a Public Switched Telephone Network (PSTN) or an Integrated Services Digital Network (ISDN).

The short-range local area network 221 comprises at least one at least one wireless portable authenticator 600. The portable authenticator 600 may communicate with local wireless communications devices 200 over the local area network 221 via a short-range high-speed wireless communication protocol, such as IEEE 802.11x and/or Bluetooth. However, the local wireless communications devices 200 and the portable authenticator 600 may implement other short-range wireless communication protocols.

Figure 2:
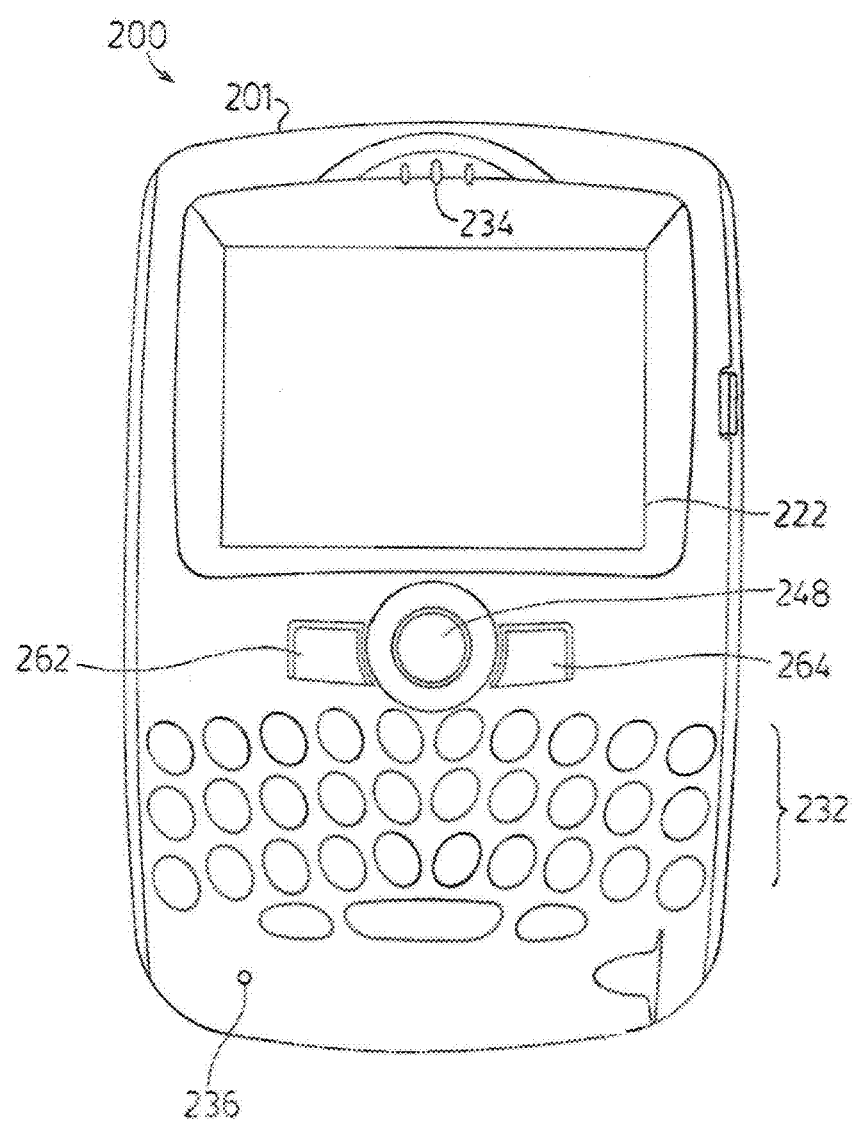
FIG. 2 is a front plan view of a handheld communications device depicted in FIG. 1.

Referring now to FIG. 2, there is shown a sample handheld communications device 200. Preferably, the handheld communications device 200 is a two-way wireless communications device having at least voice and data communication capabilities. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display 222, and a data processing system 202 (see FIG. 3) disposed within a common housing 201. The data processing system 202 is in communication with the display 222. The display 222 may comprise a backlit or sidelit LCD display. Preferably, the display backlight/sidelight (hereinafter "display light") is a variable-intensity display light, and is configured to emit visible light to enhance the readability of information rendered on the display 222.

The handheld communications device 200 also includes one or more user-operable data input devices for inputting data to the data processing system 202. As shown, the user-operable data input devices may include a keyboard 232 and a trackball 248. The keyboard 232 includes alphabetic and numerical keys, and preferably also includes a "Call" key 262 and an "End" key 264 to respectively initiate and terminate voice communication. However, the user-operable data input devices is not limited to these forms of data input, and may include a thumbwheel or other pointing device instead of (or in addition to) the trackball 248.

Figure 3:
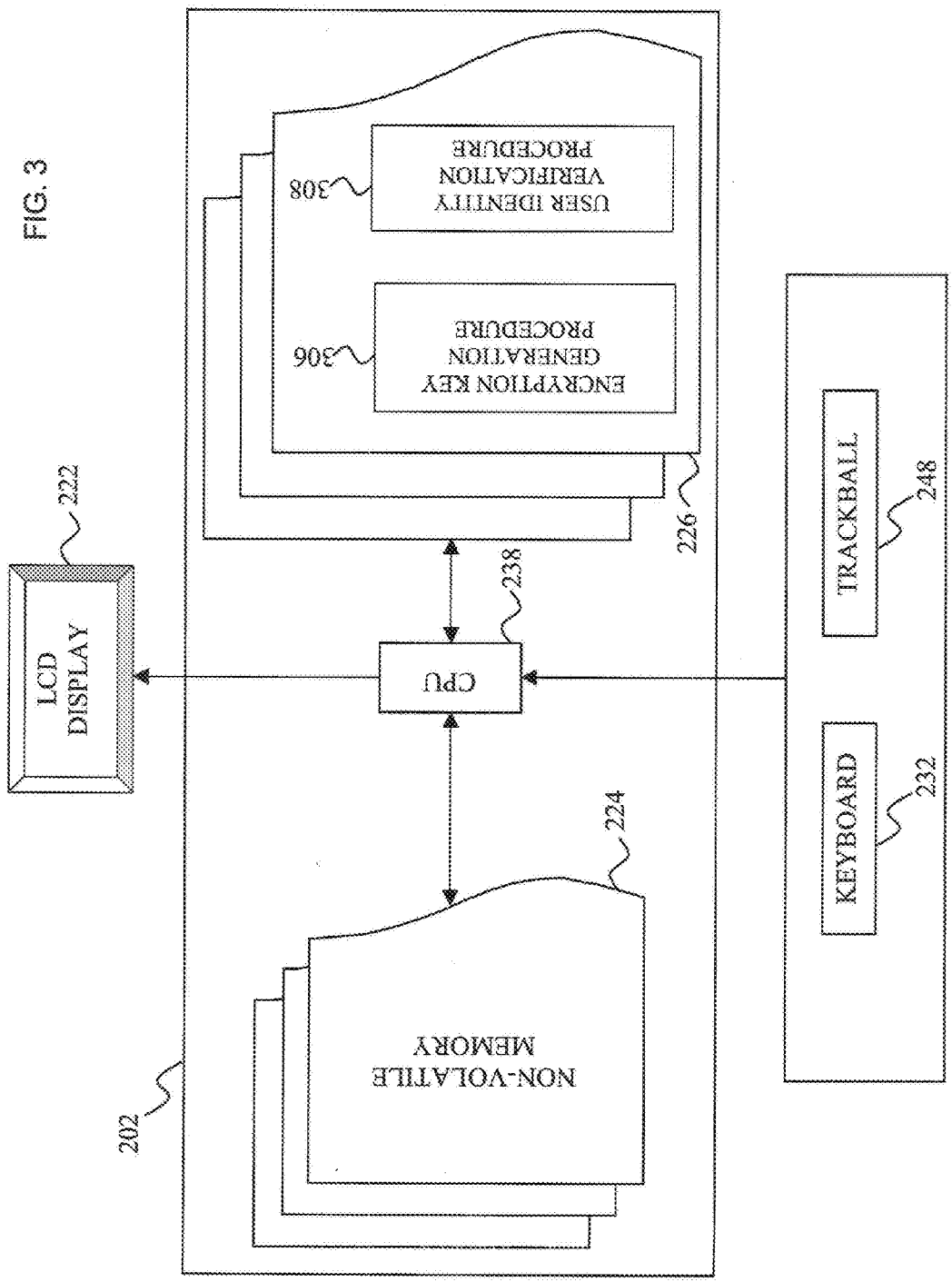
FIG. 3 is a schematic diagram depicting certain functional details of the data processing system of the handheld communications device.

As shown in FIG. 3, the data processing system 202 comprises a microprocessor 238 in communication with flash memory 224 and volatile memory (RAM) 226. The flash memory 224 includes both computer program storage 258 and program data storage areas 250, 252, 254 and 256 (see FIG. 4). The computer program storage 258 includes computer processing instructions which, when executed by the microprocessor 238, implement computer programs and an operating system 300. Alternatively, the computer processing instructions may be copied from the flash memory 224 into the RAM 226 upon system reset or power-up, and executed by the microprocessor 238 out of the RAM 226.

Typically, the computer programs include communication software that allow the user to communicate with resources over the internet, calendar software that diarizes due dates and/or appointments of importance to the user, and/or task management software that tracks of the status of tasks of importance to the user. In addition to the computer processing instructions, the memory 224, 226 also contains user profile information that includes personal information associated with the authorized user of the handheld communications device 200. Further, the memory 224, 226 also saves a public encryption key which the handheld communications device 200 uses for encrypted communication with the portable authenticator 600. Preferably the user profile information and the public encryption key are stored in a protected area of one of the program data storage areas 250, 252, 254 and 256.

The operating system allows the handheld communications device 200 to send and receive information over the communications network 100, and includes an encryption key generation procedure 306, and a user identity verification procedure 308. As will be described below, the encryption key generation procedure 306 is configured to generate an encryption key, and to securely transmit the encryption key to the portable authenticator 600 by varying the visual output of the display 222 over time in accordance with the bit sequence of the encryption key. The resulting varying visual output may comprise a sequence of chromatic colours (i.e. hues) or achromatic colours (i.e. shades of gray) that are rendered on the display device, and/or a sequence of brightness levels output by the display device, over time, and represent the bit sequence of the encryption key. It should be understood, however, that the handheld communications device 200 is not limited to transmitting encryption keys via the visual output of the display 222. Instead, the operating system may transmit any data set or data stream by the varying visual output of the display 222 based on the bit sequence of the data.

The encryption key generation procedure 306 may provide the colour/brightness sequence as the sequence of brightness levels by varying the output intensity of the display light over time based on the bit sequence of the encryption key. Alternatively, the encryption key generation procedure 306 may provide the colour/brightness sequence as the sequence of chromatic or achromatic colours by varying the background colour of the display or the predominant colour of an image rendered on the display device over time based on the bit sequence of the encryption key. Alternatively, the encryption key generation procedure 306 may provide the colour/brightness sequence as the sequence of colours and brightness levels by varying the colour produced by the display device over time while also varying the output intensity of the display light, based on the bit sequence of the encryption key.

Figure 4:
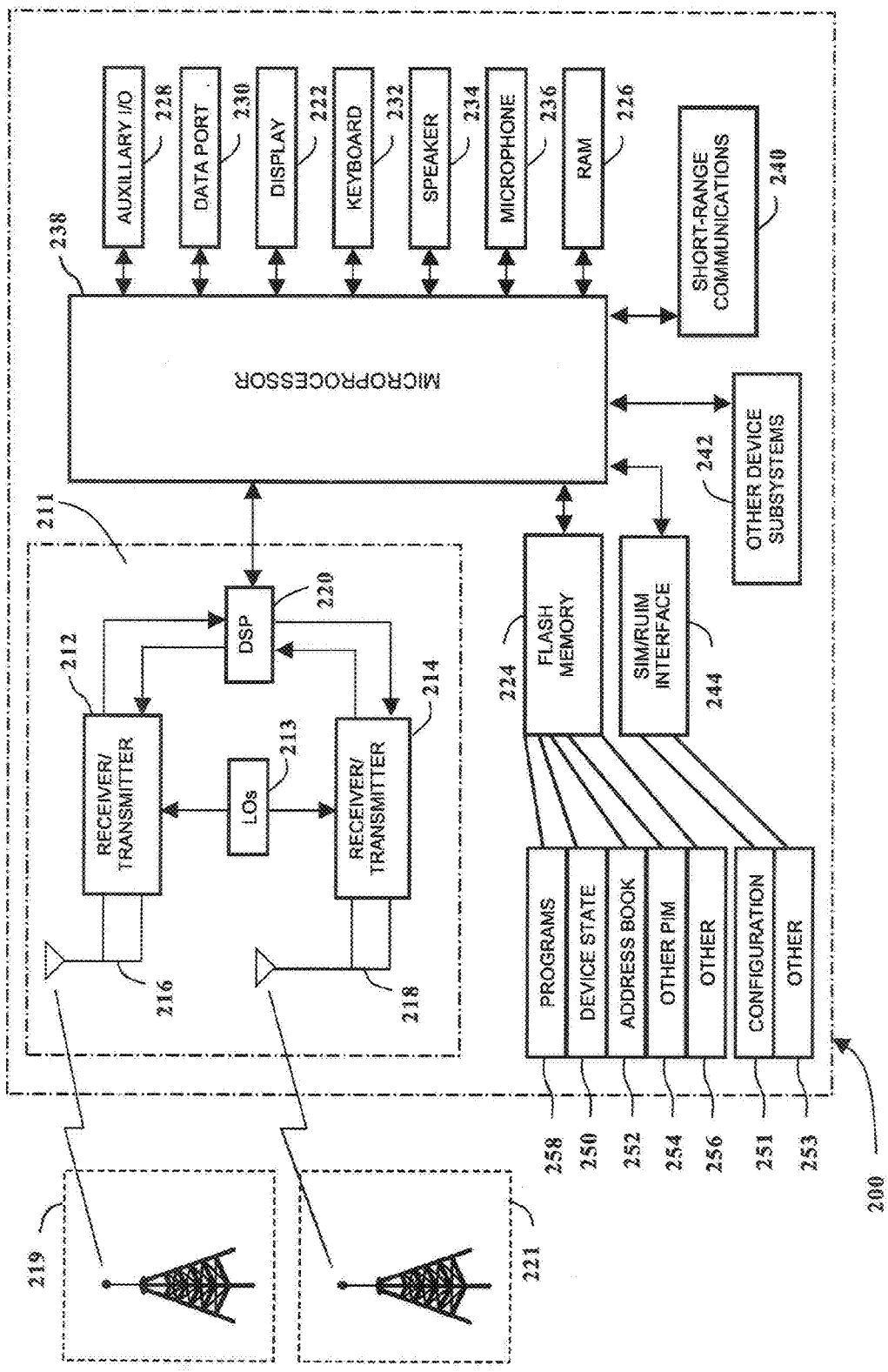
FIG. 4 is a schematic diagram depicting certain additional functional details of the handheld communications device.

The encryption key generation procedure 306 is also configured to generate a master encryption key from the temporary encryption key and from a temporary encryption key that is received from the portable authenticator 600 via the communication subsystem 211 (see FIG. 4). The encryption key generation procedure 306 is also configured to generate the public encryption key from the master encryption key and from a temporary encryption key that is received from the portable authenticator 600 via the communication subsystem 211.

The identity verification 308 is configured to transmit the user profile information (encrypted with a public encryption key received from the portable authenticator 600), and to provide a user with access to the handheld communications device 200 if an authentication message that is received from the portable authenticator 600 indicates that the profile information received from the handheld communications device 200 matches profile information that is saved on the portable authenticator 600.

Although the encryption key generation procedure 306 and the identity verification procedure 308 are both preferably implemented as computer software, the encryption key generation procedure 306 and the identity verification procedure 308 may also be implemented via electronic circuitry.

FIG. 4 depicts functional details of the handheld communications device 200. As shown, the handheld communications device 200 incorporates a motherboard that includes a communication subsystem 211, and the microprocessor 238. The communication subsystem 211 performs communication functions, such as data and voice communications, and may include a primary transmitter/receiver 212, a secondary transmitter/receiver 214, a primary internal antenna 216 for the primary transmitter/receiver 212, a secondary internal antenna 218 for the secondary transmitter/receiver 214, and local oscillators (LOs) 213 and one or more digital signal processors (DSP) 220 coupled to the transmitter/receivers 212, 214.

The communication subsystem 211 may send and receive wireless communication signals over the primary wireless network 219 via the primary transmitter/receiver 212 and the primary internal antenna 216, and may send and receive wireless communication signals over the secondary wireless network 221 via the secondary transmitter/receiver 214 and the secondary internal antenna 218. Alternatively, the communications device 200 might not be configured for wireless communication over the primary wireless network 219, in which case the communication subsystem 211 might be configured only for wireless communication over the secondary wireless network 221.

The primary internal antenna 216 may be configured for use within a Global System for Mobile Communications (GSM) cellular network or a Code Division Multiple Access (CDMA) cellular network. Further, the secondary internal antenna 218 may be configured for use within a WLAN WiFi (IEEE 802.11x) or Bluetooth network. Although the handheld communications device 200 is depicted in FIG. 2 with two antennas, it should be understood that the handheld communications device 200 may instead comprise only a single antenna, with a dual-band antenna being connected to both the primary transmitter/receiver 212 and the secondary transmitter/receiver 214.

Signals to be transmitted over the primary wireless network 219 are processed by the DSP 220 and input to transmitter section of the primary transmitter/receiver 212 for digital to analog conversion, frequency up conversion, and transmission over the primary wireless network 219 via the primary internal antenna 216. Conversely, signals received by the primary internal antenna 216 from the primary wireless network 219 are input to the receiver section of the primary transmitter/receiver 212, and then processed by the DSP 220.

Signals to be transmitted over the secondary wireless network 221 are processed by the DSP 220 and input to transmitter section of the secondary transmitter/receiver 214 for digital to analog conversion, frequency up conversion, and transmission over the secondary wireless network 221 via the secondary internal antenna 218. Conversely, signals received by the secondary internal antenna 218 from the secondary wireless network 221 are input to the receiver section of the secondary transmitter/receiver 214, and then processed by the DSP 220.

The communications device 200 also includes a SIM interface 244 if the handheld communications device 200 is configured for use within a GSM network, and/or a RUIM interface 244 if the handheld communications device 200 is configured for use within a CDMA network.

The microprocessor 238, in conjunction with the flash memory 224 and the RAM 226, comprises the aforementioned data processing system 202 which controls the overall operation of the device. The data processing system 202 interacts with device subsystems such as the display 222, flash memory 224, RAM 226, auxiliary input/output (I/O) subsystems 228, data port 230, keyboard 232, speaker 234, microphone 236, short-range communication subsystem 240, and device subsystems 242. In addition to the functions previously described herein, the operating system allows the data processing system 202 to operate the display 222, the auxiliary input/output (I/O) subsystems 228, data port 230, keyboard 232, speaker 234, microphone 236, short-range communication subsystem 240, and device subsystems 242.

Figure 5:
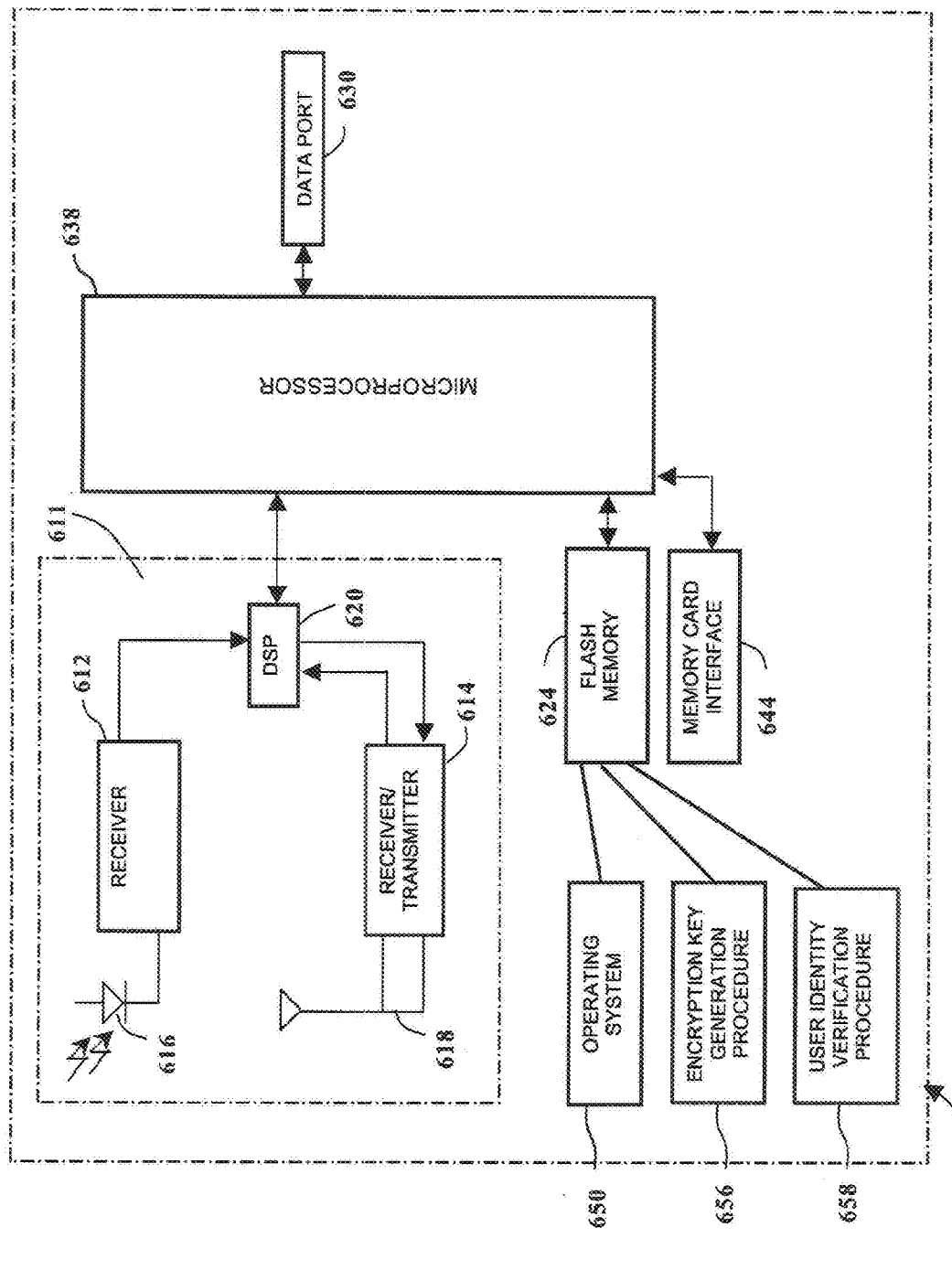
FIG. 5 is a schematic diagram depicting certain functional details of the portable authenticator.

FIG. 5 depicts functional details of the portable authenticator 600. As shown, the portable authenticator 600 includes a memory card interface 644, a communication subsystem 611, and a data processing system all disposed within a common housing. The memory card interface 644 may be exposed to the exterior of the housing, and is configured to communicate with a non-volatile memory device, such as a Smartcard or magnetic stripe card, that is either inserted into a detected by the memory card interface 644. The non-volatile memory device saves a copy of the profile information of the user that is associated with the handheld communications device 200.

Preferably, for enhanced security, the non-volatile memory device doesn't save a copy of the user profile information but, instead, saves a hashed value of the user profile information. The non-volatile memory device also saves a public encryption which the portable authenticator 600 uses for encrypted communications with the handheld communications device 200. As will be explained, preferably the public encryption key is a symmetric encryption key to the public encryption key that is maintained by the handheld communications device 200.

The communication subsystem 611 includes a primary receiver 612, a secondary transmitter/receiver 614, a light sensor 616 connected to the primary receiver 612, an internal antenna 618 connected to the secondary transmitter/receiver 614, and one or more digital signal processors (DSP) 620 coupled to the receiver 612 and the transmitter/receiver 614.

The light sensor 616 is exposed to the exterior of the housing, and is configured to continuously measure the colour and/or intensity of visible light proximate the portable authenticator 600. The sequence of the colour/intensity measurements, taken by the light sensor 616, is typically output to the primary receiver 612 as analog data. The primary receiver 612 performs common receiver functions such as analog to digital (A/D) conversion on the sequence of analog colour/intensity measurements, in preparation for more complex communication functions performed by the DSP 620.

The internal antenna 618 is configured for use within the local area wireless network 221. The communication subsystem 611 sends and receives wireless communication signals over the local area wireless network 621 via the secondary transmitter/receiver 614 and the internal antenna 618. Signal received by the internal antenna 618 from the local area wireless network 221 are input to the receiver section of the secondary transmitter/receiver 614, which performs common receiver functions such as frequency down conversion, and analog to digital (A/D) conversion, in preparation for more complex communication functions performed by the DSP 620. Signals to be transmitted over the local area wireless network are processed by the DSP 620 and input to transmitter section of the secondary transmitter/receiver 614 for digital to analog conversion, frequency up conversion, and transmission over the local area wireless network 221 via the internal antenna 618.

Preferably, the communication subsystem 611 also comprises a data port 630 that allows the portable authenticator 600 to be interfaced with an external programming device, such as a personal computer. The data port 630 may comprise a RS-232 port, a Universal Serial Bus (USB) port or other wired data communication port.

The data processing system is in communication with the memory card interface 644, and the communication subsystem 611. The data processing system comprises a microprocessor 638 in communication with flash memory 624. The flash memory 624 includes computer processing instructions which, when executed by the microprocessor 638, implement an operating system 650, an encryption key generation procedure 656, and a user identity verification procedure 658.

The operating system 650 passes to the encryption key generation procedure 656 digital colour/intensity sequence data which the portable authenticator 600 receives via the light sensor 616, the primary receiver 612, and the DSP 620. The operating system 650 also allows the user identity verification procedure 658 to receive and transmit encrypted information over the local area wireless network 221.

As will be described below, the sequence of colours and/or brightness levels produced by the handheld communications device 200 may be detected by the light sensor 616 when the display device of the handheld communications device 200 is brought in proximity to the light sensor 616 of the portable authenticator 600. The colour/brightness sequence represents the bit sequence of the encryption key that is transmitted by the handheld communications device 200. The encryption key generation procedure 656 is configured to recover the bit sequence from the sequence of colours and/or brightness levels detected by the light sensor 616, and to generate an encryption key from the recovered bit sequence. It should be understood, however, that the portable authenticator 600 is not limited to recovering encryption keys via the visual output of the display 222. Instead, the operating system 650 may recover the bit sequence of any data set or data stream from the sequence of colours and/or brightness levels detected by the light sensor 616.

As mentioned, the handheld communications device 200 may provide the colour/brightness sequence as a sequence of brightness levels. Therefore, the encryption key generation procedure 656 may recover the bit sequence from the brightness levels that are detected by the light sensor 616. The handheld communications device 200 may provide the colour/brightness sequence as a sequence of chromatic or achromatic colours. Therefore, the encryption key generation procedure 656 may recover the bit sequence from the colours that are detected by the light sensor 616. The handheld communications device 200 may provide the colour/brightness sequence as a sequence of colours contemporaneously with the sequence of brightness levels. Therefore, the encryption key generation procedure 656 may recover the bit sequence from the combination of colours and brightness levels that are detected by the light sensor 616.

As will be described below, the encryption key generation procedure 656 is also configured to transmit a temporary encryption key to the handheld communications device 200, and to generate a master encryption key from the temporary encryption key and from a temporary encryption key that is received from the handheld communications device 200 via the light sensor 616. The encryption key generation procedure 656 is also configured to generate the public encryption key from the master encryption key and from a temporary encryption key that is received from the handheld communications device 200 via the light sensor 616. The user identity verification procedure 658 is configured to transmit an authentication message to the handheld communications device 200 based on whether profile information received from the handheld communications device 200 matches the (hashed) profile information that is saved on the non-volatile memory device.

Although the encryption key generation procedure 656 and the user identity verification procedure 658 are both preferably implemented as computer software, the encryption key generation procedure 656 and the user identity verification procedure 658 may also be implemented via electronic circuitry.

Figure 6:
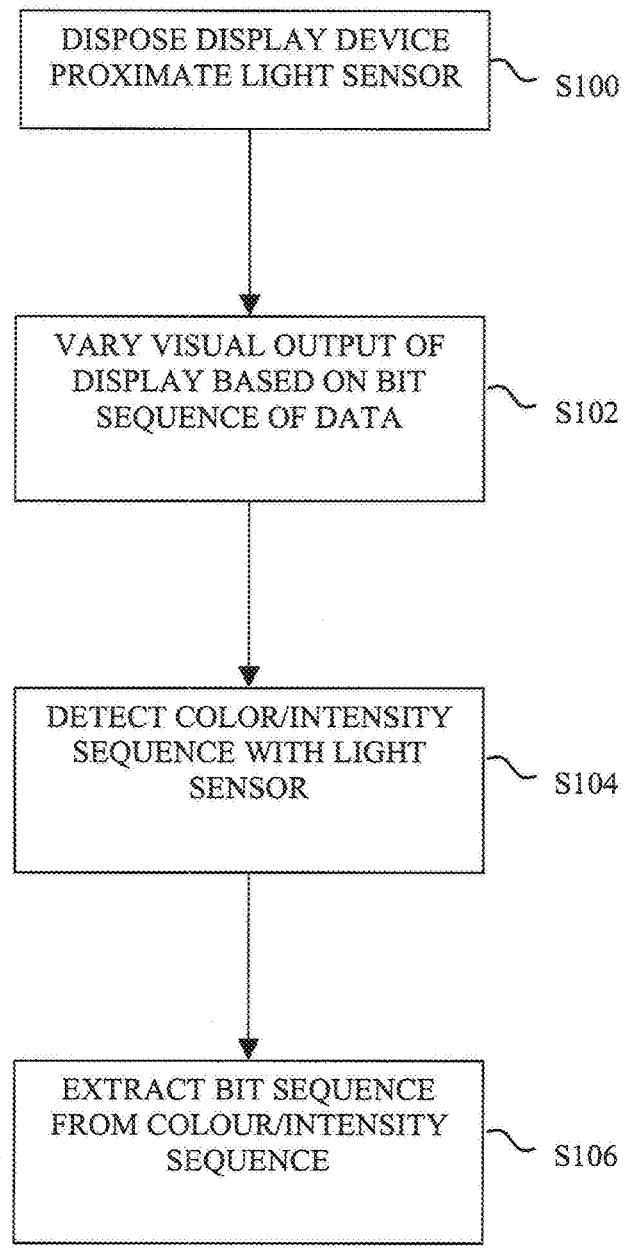
FIG. 6 is a flow chart depicting, by way of overview, the method performed by the handheld communications device when transmitting data to the portable authenticator.

FIG. 6 is a flow chart that depicts, by way of overview, the method implemented by the handheld communications device 200 for initiating secure communication with the portable authenticator 600, and the method implemented by the portable authenticator 600 for initiating secure communication with the handheld communications device 200.

At step S100, the user of the handheld communications device 200 brings the portable authenticator 600 in proximity to the handheld communications device 200, and aligns the display 222 of the handheld communications device 200 with the light sensor 616 of the portable authenticator 600.

Then, at step S102, the data processing system 202 of the handheld communications device 200 generates an encryption key, and then securely transmits the encryption key to the portable authenticator by varying the visual output (e.g. colour and/or brightness level) of the display 222 over time based on the bit sequence of the encryption key. The visual output of the display 222 thereby varies over time, such that the sequence of colours and/or brightness levels represents the bit sequence of the encryption key. As mentioned, the handheld communications device 200 is not limited to only transmitting an encryption key, but may instead transmit any data set or data stream by the varying visual output of the display 222 based on the bit sequence of the data.

The portable authenticator 600 detects the sequence of colours and/or brightness levels via the light sensor 616, at step S104, and then recovers the bit sequence from the detected colour/brightness sequence, at step S106. Preferably, the portable authenticator 600 then generates an encryption key from the recovered bit sequence. As will be appreciated, this latter step is optional where the bit sequence does not represent an encryption key.

As will be explained below, the handheld communications device 200 and the portable authenticator 600 use their generated encryption keys to compute respective public encryption keys which are then used to facilitate secure (encrypted) communication between the handheld communications device 200 and the portable authenticator 600.

Figure 7A:
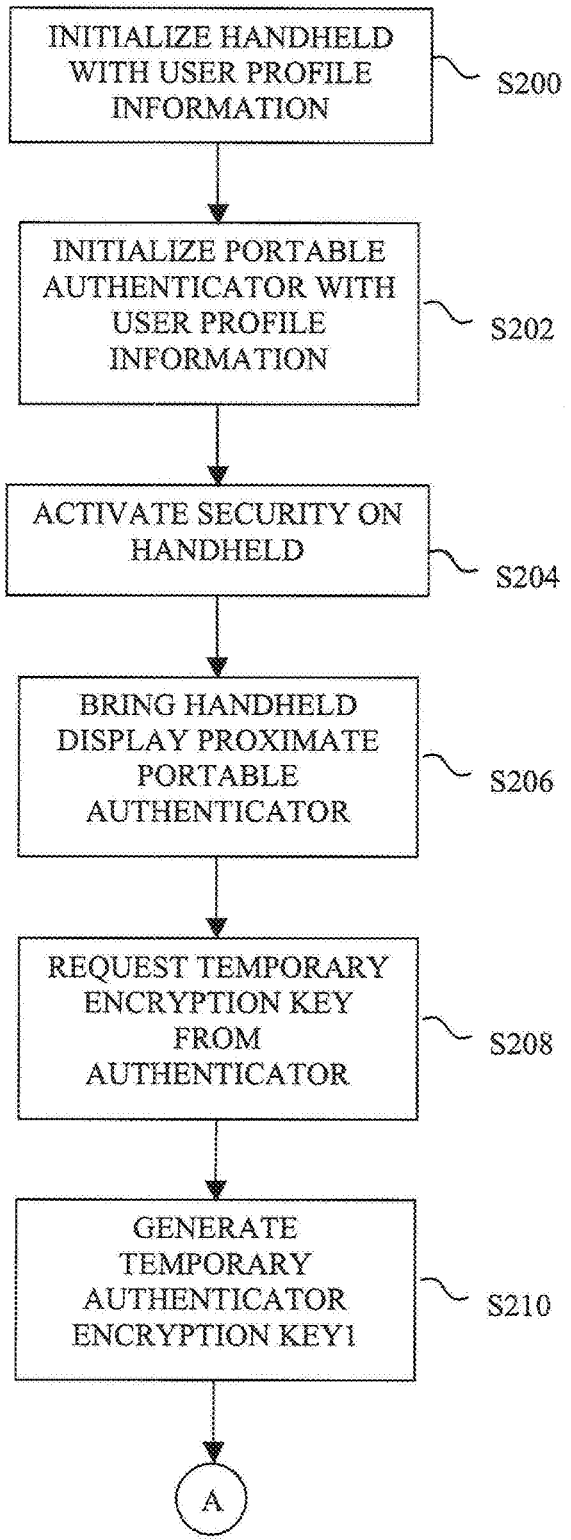
FIGS. 7A, 7B and 7C together comprise a flow chart that depicts, in detail, the method performed by the handheld communications device and the portable authenticator to generate the respective public encryption keys.
Figure 7B:
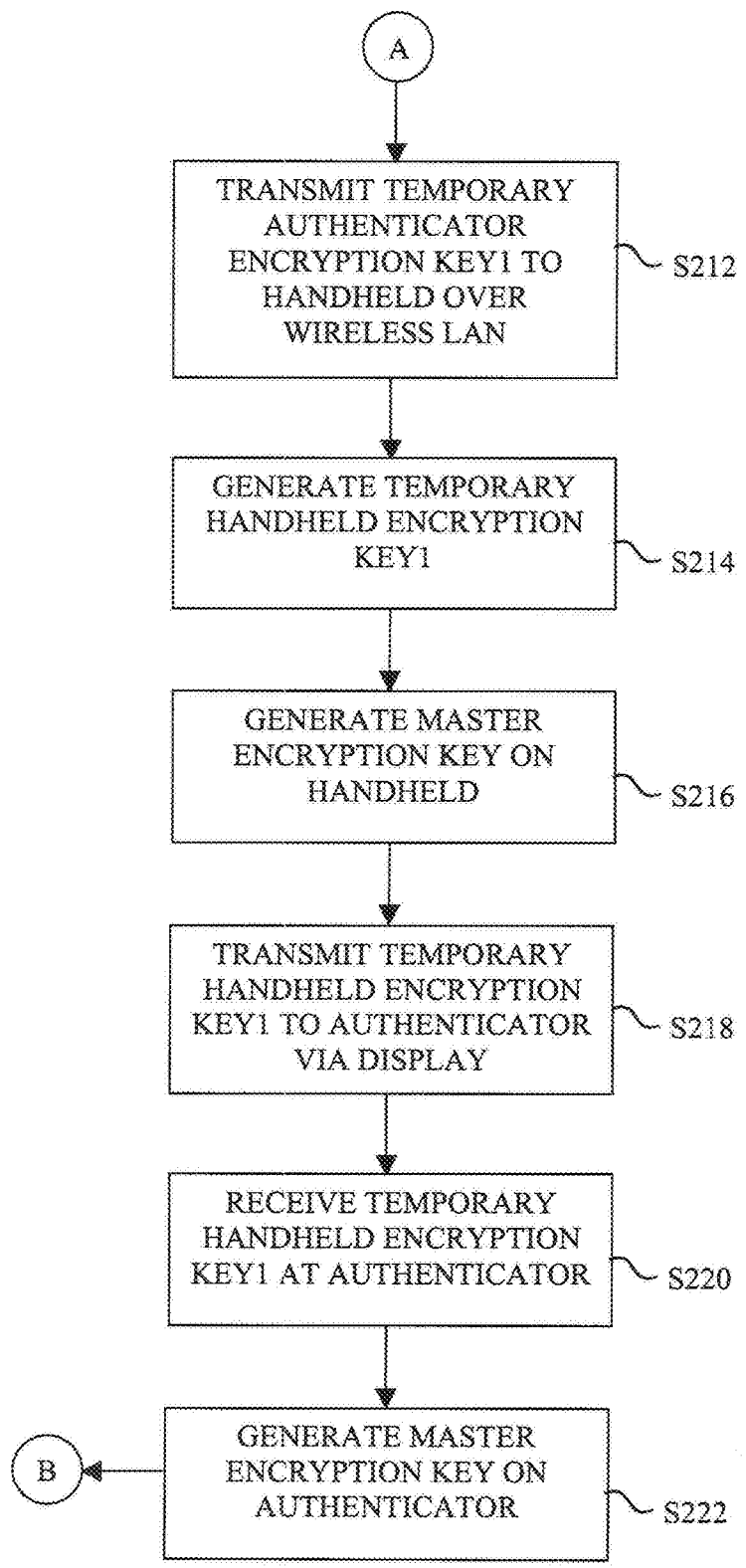
Figure 7C:
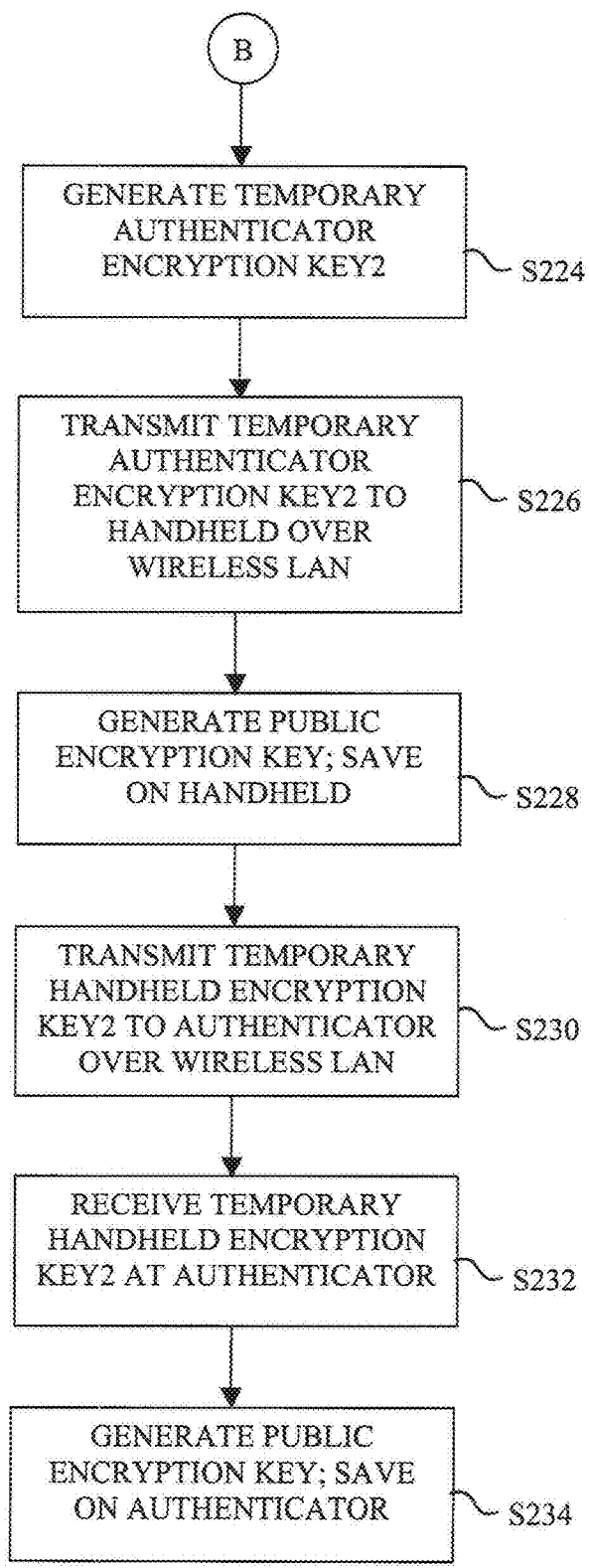

FIGS. 7A, 7B and 7C depict, in detail, the sequence of steps performed by the handheld communications device 200 and the portable authenticator 600 to generate the respective public encryption keys. At step S200, a system administrator inputs into the handheld communications device 200 user profile information relating to the user who is assigned to the handheld communications device 200. The user profile information may comprise the name, business title, and company name of the user's employer. As discussed, preferably the data processing system 202 of the handheld communications device 200 saves the user profile information in a protected area of one of the program data storage areas 250, 252, 254, 256.

At step S202, the system administrator also selects one of the portable authenticators 600 to be used with the handheld communications device 200, and then interfaces the portable authenticators 600 with an external programming device, such as a personal computer, via the data port 630 of the portable authenticator 600. The system administrator then uses the external programming device to input into the portable authenticator 600 the user profile information of the user who is assigned to the associated handheld communications device 200. Preferably, the operating system 650 the portable authenticator 600 calculates a hash value of the user profile information, and stores the hashed profile information on the non-volatile memory device that is interfaced with the memory card interface 644.

At step S204, the user of the handheld communications device 200 uses the keyboard 232 to input an initial password into the handheld communications device 200, and then activates the security option of the operating system 300. The user also uses the operating system 300 to activate the secondary transmitter/receiver 214 of the handheld communications device 200.

At step S206, the user of the handheld communications device 200 brings the portable authenticator 600 in proximity to the handheld communications device 200, and aligns the display 222 of the handheld communications device 200 with the light sensor 616 of the portable authenticator 600. The communication subsystem 211 of the handheld communications device 200 detects the presence of the portable authenticator 600 over the local area wireless network 221. In response, the data processing system 202 of the handheld communications device 200 transmits an encryption key request to the portable authenticator 600 over the local area wireless network 221 via the secondary transmitter/receiver 214 and the internal antenna 218, at step S208.

The portable authenticator 600 receives the encryption key request via the secondary transmitter/receiver 614 and the internal antenna 618. In response to the encryption key request, the encryption key generation procedure 656 of the portable authenticator 600 generates a temporary encryption key, at step S210. Typically, the encryption key generation procedure 656 generates the temporary encryption key from a unique seed value, such as a random number and/or the current date/time. At step S212, the encryption key generation procedure 656 transmits the portable authenticator's temporary encryption key to the handheld communications device 200 over the local area wireless network 221 via the secondary transmitter/receiver 614 and the internal antenna 618.

The handheld communications device 200 receives the portable authenticator's temporary encryption key via the secondary transmitter/receiver 214 and the internal antenna 218. Upon receipt of the portable authenticator's temporary encryption key, the encryption key generation procedure 306 of the handheld communications device 200 generates a temporary encryption key at step S214. Typically, the encryption key generation procedure 306 generates the temporary encryption key from a unique seed value, such as the initial password and/or the current date/time.

At step S216, the encryption key generation procedure 306 generates a master encryption key from the handheld communications device's temporary encryption key and from the portable authenticator's temporary encryption key. The document entitled "Blackberry Smart Card Reader Security", Version 1.5, Technical Overview, published by Research In Motion Limited, describes one suitable procedure for generating the master encryption keys from the temporary encryption keys. Other suitable encryption key generation algorithms will be apparent to persons of ordinary skill and are intended to be encompassed by this disclosure.

At step S218, the encryption key generation procedure 306 varies the visual output of the display 222 based on the handheld communications device's temporary encryption key. For instance, the encryption key generation procedure 306 may vary the brightness level of the display light of the display 222 over time, based on the bit sequence of the communications device's temporary encryption key. The encryption key generation procedure 306 may vary the background colour that is rendered on the display 222 over time based on the bit sequence of the communications device's temporary encryption key. The encryption key generation procedure 306 may vary the background colour over time contemporaneously with the brightness level of the display 222 based on the bit sequence of the communications device's temporary encryption key.

The visual output of the display varies over time, such that the generated sequence represents the bit sequence of the temporary encryption key. For example, the varying visual output may comprise a sequence of display light brightness levels which consist only of the minimum brightness level and the maximum brightness level of the display light. Accordingly, in one implementation, the encryption key generation procedure 306 modulates the display light brightness with each bit of the temporary encryption key such that, for each bit of the temporary encryption key, the display light is either fully on or fully off. Further, preferably the encryption key generation procedure 656 displays a substantially solid white or gray image on the display 222 to emphasize the difference between the resulting display light intensity levels.

In one variation of the foregoing, the sequence of display light brightness levels may consist of a brightness level corresponding to the minimum brightness of the display light, a brightness level corresponding to the maximum brightness of the display light, and at least one brightness level that is intermediate the minimum brightness and the maximum brightness of the display light. Accordingly, in another implementation, the encryption key generation procedure 306 groups the bits of the temporary encryption key into bit pairs (di-bits) such that, for each di-bit of the temporary encryption key, the visual output of the display light is at one of four distinct brightness levels. Alternative bit groupings, including octets and hex-tets, can be employed depending upon the maximum brightness and the minimum brightness of the display light, and the sensitivity of the light sensor 616 of the portable authenticator 600.

Alternatively, the varying visual output may comprise a sequence of colours. Accordingly, in another implementation, the encryption key generation procedure 306 varies the background colour of the display 222 or the predominant colour of an image rendered on the display 222, over time with each bit of the temporary encryption key such that, for each bit of the temporary encryption key, the colour produced by the display 222 is either white/gray or black.

In one variation of the foregoing, the sequence of background colours may consist of a range of chromatic or achromatic colours. Accordingly, in another implementation, the encryption key generation procedure 306 groups the bits of the temporary encryption key into di-bits such that, for each di-bit of the temporary encryption key, the background colour of the display 222, or the predominant colour of an image on the display 222, is rendered in one of four distinct colours. Alternative bit groupings can be employed depending upon the colour space of the display 222, and the sensitivity of the light sensor 616 of the portable authenticator 600.

Alternatively, the varying visual output may comprise a sequence of a plurality of display light brightness levels and a sequence of a plurality of colours. Accordingly, in yet another implementation, the encryption key generation procedure 306 groups the bits of the temporary encryption key into hex-tets such that, for each hex-tet of the temporary encryption key, the background colour of the display 222 or the predominant colour of an image on the display 222, is rendered in one of four distinct colours, and the display light is at one of four distinct brightness levels. Alternative bit groupings and color/intensity combinations can be employed depending upon the colour space of the display 222, the maximum brightness and the minimum brightness of the display light, and the sensitivity of the light sensor 616 of the portable authenticator 600.

Since the portable authenticator 600 is in proximity to the display 222, the light sensor 616 receives the colour/brightness sequence and outputs to the encryption key generation procedure 656 a series of data bits based on the colour/brightness levels detected over time.

The encryption key generation procedure 656 receives the colour/brightness sequence via the light sensor 616, and converts the colour/brightness sequence into the corresponding bits of the handheld communications device's temporary encryption key, at step S220. Preferably, the colour/brightness sequence includes a standard start sequence of colour/brightness transitions to allow the DSP 620 to synchronize itself to the colour/brightness sequence and thereby allow the encryption key generation procedure 656 to properly detect the bits of the handheld communications device's temporary encryption key. At step S222, the encryption key generation procedure 656 generates a master encryption key from the handheld communications device's temporary encryption key and the portable authenticator's temporary encryption key.

After the master encryption keys have been generated, the master encryption keys are used to generate a pair of public encryption keys. To do so, at step S224, the encryption key generation procedure 656 of the portable authenticator 600 generates a second temporary encryption key. At step S226, the encryption key generation procedure 656 transmits the portable authenticator's second temporary encryption key to the handheld communications device 200 over the local area wireless network 221.

Upon receipt of the portable authenticator's second temporary encryption key, the encryption key generation procedure 306 of the handheld communications device 200 generates a second temporary encryption key. At step S228, the encryption key generation procedure 306 generates a public encryption key from the handheld communications device's master encryption key and from the portable authenticator's second temporary encryption key, and then saves the master encryption key in one of the program data storage areas 250, 252, 254, 256. Preferably, the encryption key generation procedure 306 saves the public encryption key in a data storage area that is inaccessible to the user. The document entitled "Blackberry Smart Card Reader Security", Version 1.5, Technical Overview, published by Research In Motion Limited, describes one suitable procedure for generating the public encryption keys from the master encryption key. Other suitable encryption key generation algorithms will be apparent to persons of ordinary skill and are intended to be encompassed by this disclosure.

At step S230, the data processing system 202 of the handheld communications device 200 transmits the second temporary encryption key to the portable authenticator 600 over the local area wireless network 221 via the secondary transmitter/receiver 214 and the internal antenna 218.

The portable authenticator 600 receives the handheld communications device's second temporary encryption key via the secondary transmitter/receiver 614 and the internal antenna 618, at step S232. At step S234, the encryption key generation procedure 656 computes a public encryption key from the handheld communications device's second encryption key and from the portable authenticator's master encryption key, and then saves the public encryption key on the non-volatile memory device that is interfaced with the memory card interface 644. Preferably, the handheld communications device's public encryption key and the portable authenticator's public encryption key are symmetric, such that a communication encrypted with one public encryption key can be decrypted with the other public encryption key.

Figure 8A:
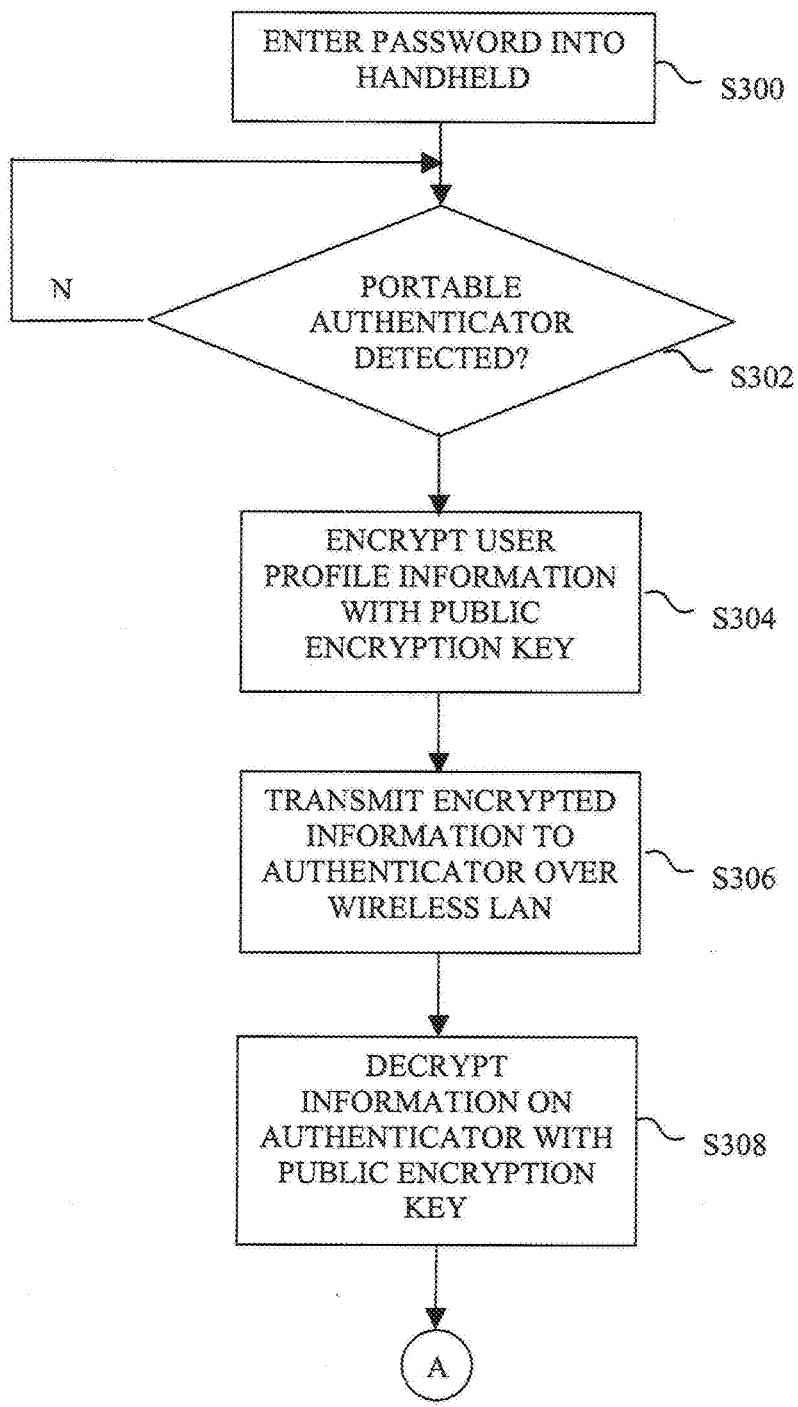
FIGS. 8A and 8B together comprise a flow chart that depicts, in detail, the method performed by the handheld communications device and the portable authenticator to control access to the handheld communications device.
Figure 8B:
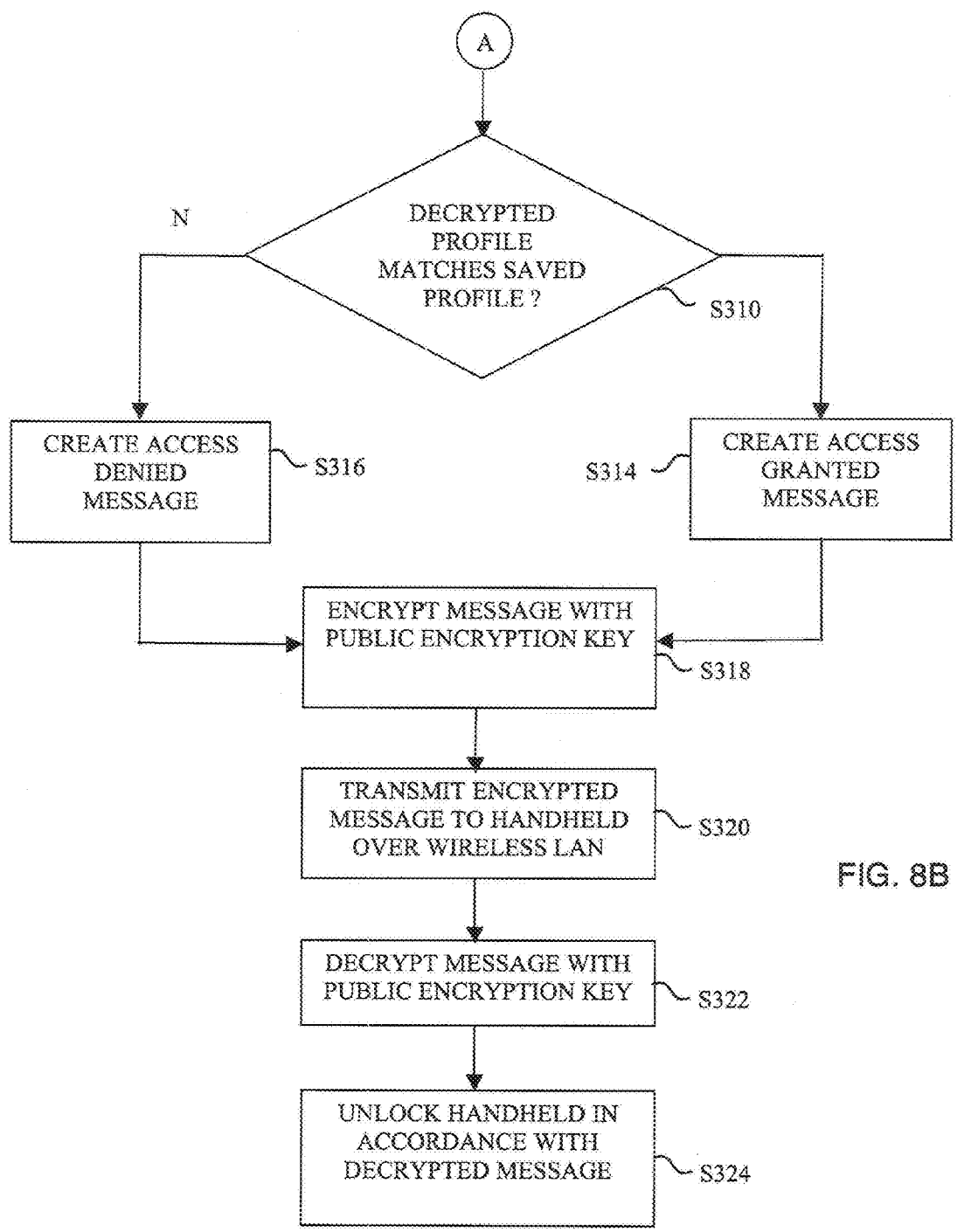

FIGS. 8A and 8B depict, in detail, the sequence of steps performed by the handheld communications device 200 and the portable authenticator 600 to control access to the handheld communications device 200. At step S300, the user of the handheld communications device 200 enters the password into the handheld communications device 200 via the keyboard 232. If the entered password matches the password input at step S204, at step S302 the user identity verification procedure 308 of the handheld communications device 200 determines whether the portable authenticator 600 is accessible to the handheld communications device 200 via the local area wireless network 221.

If the portable authenticator 600 is accessible to the handheld communications device 200, the user identity verification procedure 308 accesses the user profile information and the public encryption key from the appropriate program data storage 250, 252, 254, 256, and encrypts the user profile information with the public encryption key at step S304. At step 306, the user identity verification procedure 308 transmits the encrypted user profile information to the portable authenticator 600 over the local area wireless network 221 via the secondary transmitter/receiver 214 and the internal antenna 218.

The portable authenticator 600 receives the encrypted user profile information via the secondary transmitter/receiver 614 and the internal antenna 618. In response to the encrypted user profile information, the user identity verification procedure 658 of the portable authenticator 600 accesses the public encryption key that is stored on the non-volatile memory device that is interfaced with the memory card interface 644, and then decrypts the encrypted user profile information using the public encryption key, at step S308.

At step S310, the user identity verification procedure 658 calculates the hash value of the decrypted user profile information. The user identity verification procedure 658 then compares the hash value against the hash value of the user profile information that is stored on the non-volatile memory device, at step S312. If the two hash values match, the user is authenticated and the user identity verification procedure 658 generates an "access granted" authorization message at step S314. Otherwise, the user identity verification procedure 658 generates an "access denied" authorization message, at step S316. The user identity verification procedure 658 then encrypts the authorization message with the portable authenticator's public encryption key at step S318, and transmits the encrypted authorization message to the handheld communications device 200 over the local area wireless network 221 via the secondary transmitter/receiver 614 and the internal antenna 618, at step S320.

The handheld communications device 200 receives the encrypted authorization message via the secondary transmitter/receiver 214 and the internal antenna 218. Upon receipt of the encrypted message, the user identity verification procedure 308 of the handheld communications device 200 decrypts the authorization message using the handheld communications device's public encryption key at step S322. The user identity verification procedure 308 then grants the user access to the handheld communications device 200, at step S324, depending upon the contents of the decrypted message.

The user identity verification procedure 308 of the handheld communications device 200 continuously determines whether the portable authenticator 600 is accessible to the handheld communications device 200 via the local area wireless network 221. If the user identity verification procedure 308 unlocked the handheld communications device 200 at step S324, and the user identity verification procedure 308 of the handheld communications device 200 subsequently determines that the portable authenticator 600 is no longer accessible to the handheld communications device 200 via the local area wireless network 221, the user identity verification procedure 308 denies the user further access to the handheld communications device 200 until the portable authenticator 600 grants access again via steps S300 to S324.

The invention claimed is:

1. A handheld communications device comprising:
a display device having a backlight; and a data processor in communication with the display device, the data processor being configured to: generate an encryption key, the encryption key comprising a bit sequence; vary a predominant colour in an image over a period of time in an output generated on the display device to transmit a first part of the encryption key from the handheld communications device; and generate either a substantially solid white or gray image on the display and vary a sequence of brightness levels output by the backlight to transmit a second part of the encryption key.

2. The handheld communications device as claimed in claim 1, wherein:
the display device is further configured to render a plurality of colours thereon; and the data processor is configured to vary a sequence of the plurality of colours and the sequence of brightness levels to transmit the first part of the encryption key.

3. The handheld communications device as claimed in claim 1, wherein:
the display device is further configured to render a plurality of colours thereon; and the data processor is further configured to vary a sequence of the plurality of colours to transmit the first part of the encryption key.

4. The handheld communications device as claimed in claim 1, further comprising;
a wireless interface; and
a memory, wherein the data processor is:
in communication with wireless interface and the memory; and
is further configured to
receive a temporary encryption key via the wireless interface;
compute a master encryption key from the temporary encryption key and the encryption key;

receive a second temporary encryption key via the wireless interface;

compute a public encryption key from the second temporary encryption key and the master encryption key; and save the public encryption key in the memory.

5. The handheld communications device as claimed in claim 4, wherein the data processor is further configured to:

encrypt data with the public encryption key;

transmit the encrypted data via the wireless interface;

receive via the wireless interface an authorization message in response to the encrypted data;

and provide a user with access to the communications device based on the authorization message.

6. The handheld communications device as claimed in claim 1, wherein: a background colour is varied over the period of time in the output of the display device to transmit the first part of the encryption key.

7. A handheld communications device comprising a display device, a backlight for the display device and a data processor in communication with the display device, the handheld communications device comprising:

a data processor in communication with the display device, the data processor being configured to:

generate an encryption key via the data processor, the encryption key comprising a bit sequence; and generate either a substantially solid white or gray image on the display device and vary a sequence of brightness levels of output by the backlight to transmit a first part of the encryption key.

8. The handheld communications device as claimed in claim 7, wherein the data processor is further configured to:

vary a background colour of an image over a period of time in an output generated on the display device to transmit a second part of the encryption key.

9. The handheld communications device as claimed in claim 7, wherein the data processor is further configured to:

vary a sequence of plurality of colours in the output of the display device over the period of time to transmit a second part of the encryption key from the handheld communications device.

10. The handheld communications device as claimed in claim 7, wherein the data processor is further configured to:

vary a predominant colour in an image generated on the display device over the period of time to transmit a second part of the encryption key from the handheld communications device.

11. The handheld communications device as claimed in claim 7, wherein the data processor is further configured to:

receive a temporary encryption key via a wireless interface in the handheld communications device;

compute a master encryption key from the temporary encryption key and the encryption key;

receive a second temporary encryption key via the wireless interface;

compute a public encryption key from the second temporary encryption key and the master encryption key via the data processor; and save the public encryption key in a memory in the handheld communications device.

12. The handheld communications device as claimed in claim 7, wherein the predominant colour is one of four colours used to encode the bit sequence for the second part of the encryption key.

* * * * *